Patented July 10, 1934

1,965,792

UNITED STATES PATENT OFFICE 1,965,792

ESTERS OF UNSUBSTITUTED AND ALPHA-SUBSTITUTED CYCLOPENTENYLACETIC ACID AND THEIR PRODUCTION

René Chaux, Paris, France, assignor to Compagnie De Bethune, Bully-Les-Mines, France, a corporation of France No Drawing. Application February 26, 1932, Serial No. 595,428. In France March 6, 1931

2 Claims. (Cl. 260—106)

This invention relates to a method of preparing derivatives from cyclopentenylacetic and from α-substituted cyclopentenylacetic acids.

The object of this invention is to provide for obtaining fragrant products through esterification of cyclopentenylated derivatives from acetic acid and from α-substituted acetic acids, the esters being of the general formula

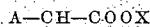

where A denotes a cyclopentenyl nucleus, R one atom of hydrogen or an alkyl, cyclopentenyl or phenyl radical; X a radical of alcohol or of phenol. I have found that the position of the ethylene bond in the cyclopentenyl nucleus exerts no substantial influence on the fundamental fragrancy of isomeric esters. The contemplated acids may, therefore, belong either to the series $\Delta_2$:

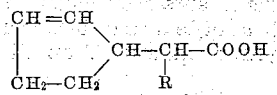

where R=atom of hydrogen or alkyl, cyclopentenyl or phenyl radical, or to the series $\Delta_1$ or to the tautomeric cyclopentylidene series:

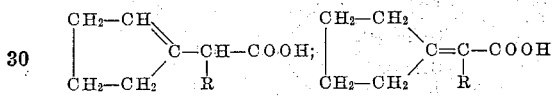

where R=atom of hydrogen or alkyl, cyclopentenyl or phenyl radical.

In the prior art, methods are known of preparing $\Delta_2$-cyclopentenylacetic acid (Beilstein, 4th edition) as well as $\Delta_1$-cyclopentenylacetic and cyclopentylidenacetic acids (for instance: Wallach, Lieb. Ann. 347, 326 (1906); Harding and Haworth, J. Chem. Soc. 97, 486 (1910); Goldberg and Linstead, J. Chem. Soc. (1928), 2344; Linstead, J. Chem. Soc. 1930, 1603).

Methods are also known of preparing α-substituted $\Delta_2$-cyclopentenylacetic acids (for instance: Perkins and Cruz, J. Amer. Chem. Soc. 49, 517 (1927); Arvin and Adams, J. Amer. Chem. Soc. 49, 2940 (1927), as well as α-substituted $\Delta_1$-cyclopentenylacetic acids (for instance: Kon and Thakur, J. Chem. Soc. 1930, 2217).

The methods of esterification which may be advantageously used vary according to the alcohols brought under reaction.

For instance, in the case of primary or secondary aliphatic or aromatic alcohols, the acid and the alcohol may be heated with return flow in the presence of a small proportion of a strong mineral acid, as a catlyzer, avail being eventually taken of the formation of azeotropic mixtures for eliminating the water formed during the reaction.

Where a halogen derivative is inexpensively available, it may be caused to react on a metallic salt of the contemplated acid.

Where it is a case of esterifying a tertiary alcohol or any other alcohol sensitive to acids and to heat, the chloride or the anhydride of the contemplated acid is caused to react cold on the alcohol in the presence of an organic base.

The chloride of the acid may be caused to react on an alcoholic or on a phenolic alkaline derivative.

Example 1.—126 grams of $\Delta_2$-cyclopentenylacetic acid (1 molecule) are heated with return flow together with 132 grams of isoamyl alcohol (1.5 molecules) and 4 grams of pure sulphuric acid at 66° Bé. for six hours. The sulphuric acid is then neutralized by means of soda, with Congo red as an indicator. Isoamyl alcohol in excess is eliminated through distillation. Then the residue, after having been washed with a sodium carbonate solution, in order to recover the acid which has not reacted, is rectified under reduced pressure. $\Delta_2$-cyclopentenylacetate of isoamyl boils at 116–117° C. under 14 mm.

By the same method esters of $\Delta_2$-cyclopentenylacetic acid such as the following may be prepared:

Propyl (boiling point 17 mm.=99° C.); isopropyl (B. P. 5 mm.=70–73° C.); isobutyl (B. P. 11 mm.=107° C.); secondary butyl (B. P. 11 mm.=96–101° C.); allyl (B. P. 15 mm.=95–96° C.); phenylethyl (B. P. 11 mm.=171° C.); cyclohexyl (B. P. 10 mm.=132–133° C.); cinnamyl (B. P. 14 mm.=201–202° C.).

Example 2.—In a container provided with a stirrer is heated, with return flow while energetically stirring, a suspension of 148 grams of $\Delta_2$-cyclopentenylacetate of sodium (1 molecule) finely powdered and dessicated, in 139 grams of benzyl chloride (1.1 molecules). At the end of four hours, most of the acid is esterified. I then treat with water in order to dissolve the sodium chloride which has been formed and to recover the $\Delta_2$-cyclopentenylacetate of sodium which has not reacted. I then rectify the product under reduced pressure after having washed and dried it so as to separate the unaltered benzyl chloride from the $\Delta_2$-cyclopentenylacetate of benzyl. The latter boils at 162–163° C. under 13 mm.

Example 3.—I mix little by little, while cooling, 145 grams (1 molecule) of chloride of $\Delta_2$-cyclopentenylacetic acid (B. P. 12 mm.=62-63° C.) with a mixture of 154 grams of terpineol (1 molecule) and of 79 grams of pyridine (1 molecule). This mixture is allowed to stand for twelve hours at room temperature. Then I treat with water in order to dissolve the chlorhydrate of pyridine, which has been formed, and rectify the product under reduced pressure after having washed and dried it. $\Delta_2$-cyclopentenylacetate of terpineol boils at 165-170° C. under 6 mm.

I can also prepare the following esters by the same method and by means of $\Delta_2$-cyclopentenylacetic acid: tertiary butyl (B. P. 12 mm.=117° C.); secondary octyl (B. P. 16 mm.=154-157° C.); citronellol (B. P. 10 mm.=172°-173° C.); linalyle (B. P. 6 mm.=108-155° C.); geranyle (B. P. 5 mm.=160-161° C.); borneol (B. P. 11 mm.=164-165° C.); isoborneol (B. P. 13 mm.=171-173° C.); guaiacol (B. P. 11 mm.=174-176° C.); p-cresol (B. P. 4 mm.=147° C.); m-cresol (B. P. 4 mm.=141° C.); thymol (B. P. 6 mm.=159-161° C.); eugenol (B. P. 7 mm.=187-190° C.); isoeugenol (B. P. 10 mm.=208° C.); carvacrol (B. P. 5 mm.=165-168° C.); menthol (B. P. 12 mm.=170° C.); vanilline (B. P. 4 mm.=202-203° C.); o-methylcyclohexanol (B. P. 8 mm.=137-139° C.); m-methylcyclohexanol (B. P. 8 mm.=138-140° C.); p-methylcyclohexanol (B. P. 8 mm.=138-140° C.), etc.

By means of the chloride of the methyl $\Delta_2$-cyclopentenyl-acetic acid (B. P. 19 mm.=83-84° C.), I can obtain, for instance, esters such as: ethyl (B. P. 3 mm.=68° C.); isobutyl (B. P. 2 mm.=74-78° C.); benzyl (B. P. 2 mm.=135-136° C.), etc.

By means of chloride of the ethyl $\Delta_2$-cyclopentenylacetic acid (B. P. 18 mm.=94° C.), I can obtain esters such as: methyl (B. P. 19 mm.=93-95° C.); ethyl (B. P. 16 mm.=101° C.); isobutyl (B. P. 9 mm.=114-115° C.); isoamyl (B. P. 10 mm.=122° C.); phenylethyl (B. P. 9 mm.=174-175° C.), etc.

By means of the chloride of the allyl $\Delta_2$-cyclopentenylacetic acid (B. P. 11 mm.=96-98° C.), I can obtain esters such as: methyl (B. P. 12 mm.=97° C.); ethyl (B. P. 17 mm.=113-114° C.); propyl (B. P. 14 mm.=124-125° C.); isopropyl (B. P. 16 mm.=116° C.); isobutyl (B. P. 12 mm.=127-128° C.); isoamyl (B. P. 5 mm.=123-125° C.); allyl (B. P. 15 mm.=124-125° C.); benzyl (B. P. 5 mm.=162-164° C.); cinnamyl (B. P. 9 mm.=207-208° C.), etc.

By means of the bis-$\Delta_2$-cyclopentenylacetic acid (B. P. 13 mm.=135-137° C.), I can obtain esters such as: methyl (B. P. 4 mm.=112-114° C.); ethyl (B. P. 15 mm.=142-143° C.); isobutyl (B. P. 13 mm.=157-158° C.), phenyl, etc.

By means of the chloride of the phenyl $\Delta_2$-cyclopentenylacetic acid (B. P. 12 mm.=148° C.), I can obtain such esters as: methyl (B. P. 4-5 mm.=130-131° C.); ethyl (B. P. 4-5 mm.=138-139° C.); benzyl (B. P. 3-4 mm.=196-197° C.), etc.

*Example 4.*—I add little by little, while energetically stirring, 145 grams of chloride of $\Delta_2$-cyclopentenylacetic acid (1 molecule) to a suspension of 116 grams (1 molecule) of dry phenate of sodium having been powdered in 500 cubic centimeters of anhydrous toluene. I then heat the whole in a water bath for four hours while stirring. Then I treat with water and rectify the washed and dried product. $\Delta_2$-cyclopentenylacetate of phenyl boils at 112-113° C. under 4 mm.

The methods described in the four foregoing examples are applicable to acids of the $\Delta_1$-series and to their cyclopentylidene tautomeric derivatives. The esters so obtained have, as to fragrancy, properties proximate to those of the corresponding esters of the $\Delta_2$-series.

As examples, the following esters may be mentioned: $\Delta_1$-cyclopentenylacetate of ethyl: B. P. 15-16 mm.=75-80° C. $\Delta_1$-cyclopentenylacetate of benzyl: B. P. 11-12 mm.=160° C. $\Delta_1$-cyclopentenylacetate of phenylethyl: B. P. 11-12 mm.=170-171° C. $\Delta_1$-cyclopentenylacetate of cyclohexyl: B. P. 10 mm.=129-130° C.

I claim as my invention:—

1. A process for the preparation of fragrant compositions adapted to be used in the manufacture of perfumes, comprising esterifying cyclopentenylacetic acid to form compounds represented by the general formula

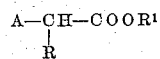

in which A represents a cyclopentene nucleus, R an alkyl radical of less than 5 carbon atoms or a cyclopentenyl radical, and $R^1$ an alkyl or phenyl radical.

2. New compounds of the formula:

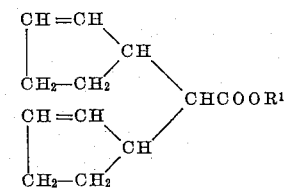

in which $R^1$ represents an alkyl radical or a phenyl radical.

RENÉ CHAUX.